(12) United States Patent
Huang

(10) Patent No.: US 7,914,162 B1
(45) Date of Patent: Mar. 29, 2011

(54) LED LIGHT ASSEMBLY HAVING HEATING BOARD

(75) Inventor: Nan Huang, Rancho Palos Verdes, CA (US)

(73) Assignee: Grand General Accessories Manufacturing, Rancho Dominguez, CA (US)

( * ) Notice: Subject to any disclaimer, the term of this patent is extended or adjusted under 35 U.S.C. 154(b) by 200 days.

(21) Appl. No.: 11/895,139

(22) Filed: Aug. 23, 2007

(51) Int. Cl.
*F21V 29/02* (2006.01)
*B60L 1/14* (2006.01)

(52) U.S. Cl. ............ 362/92; 362/545; 362/249.02; 362/294; 362/373; 219/220

(58) Field of Classification Search .......... 219/202–203, 219/220; 362/92, 267, 294, 543–545, 547, 362/373, 249.02–249.06, 311.02, 202–208
See application file for complete search history.

(56) References Cited

U.S. PATENT DOCUMENTS

| | | |
|---|---|---|
| 1,816,299 A | 7/1931 | Rynearson |
| 1,925,423 A | 9/1933 | Warhus, Jr. |
| 1,951,902 A | 3/1934 | Dempsey |
| 3,364,381 A | 1/1968 | Porter |
| 3,406,282 A | 10/1968 | Kinch |
| 4,728,775 A | 3/1988 | Straten |
| 5,182,432 A | 1/1993 | Lange et al. |
| 5,558,431 A | 9/1996 | Wilson |
| 6,367,949 B1 * | 4/2002 | Pederson ............. 362/240 |
| 6,563,086 B1 | 5/2003 | Meirndorf |
| 6,601,983 B1 | 8/2003 | Runfola et al. |
| 7,262,388 B2 * | 8/2007 | Moreth et al. ........... 219/220 |
| 2003/0189835 A1 * | 10/2003 | Tsukamoto ............ 362/475 |
| 2004/0070339 A1 | 4/2004 | Suda et al. |
| 2004/0208009 A1 * | 10/2004 | Mardon et al. ......... 362/373 |
| 2006/0011598 A1 | 1/2006 | Yasuda |
| 2006/0067077 A1 * | 3/2006 | Kumthampinij et al. ..... 362/294 |
| 2006/0104077 A1 | 5/2006 | Oshio et al. |
| 2006/0232972 A1 | 10/2006 | Mochizuku |
| 2006/0245202 A1 | 11/2006 | Moreth et al. |
| 2007/0025105 A1 | 2/2007 | Inoue et al. |

FOREIGN PATENT DOCUMENTS

| | | |
|---|---|---|
| GB | 2334571 | 8/1999 |
| JP | 2002150812 | 5/2002 |

* cited by examiner

*Primary Examiner* — Ismael Negron
(74) *Attorney, Agent, or Firm* — Thomas I. Rozsa

(57) ABSTRACT

A light assembly including a housing, a plurality of light emitting diodes (LED) on a circuit board, a lens, a lens cover and a heating board positioned within the housing. The heating board is positioned behind the lens and in front of LEDs within the housing, such that light from the LEDs shines through the heating board. The heating board also includes a sensor and a microcontroller to activate, deactivate and control the heating board in response to an outside air temperature.

26 Claims, 12 Drawing Sheets

LED LIGHT ASSEMBLY HAVING HEATING BOARD

BACKGROUND OF THE INVENTION

1. Field of the Invention

The present invention relates generally to light assemblies and more particularly to heated light assemblies or use in vehicles which operate in cold weather wherein the lens of the light beam assembly becomes frosted over because of the cold conditions.

2. Description of the Prior Art

The integration of light emitting diodes (LEDs) in lamp assemblies are well known in the art. LED lamp assemblies for use on motor vehicles are also well known in the art. LED lamp assemblies have distinct advantages over incandescent bulbs, which are more commonly used. LED lamp assemblies have much longer lives, so their utility is longer, more reliable, and more cost efficient. One of the key advantages of LED-based lighting is its high efficiency based on the light produced (lumens) per unit of power used. Most LEDs require very little current and power, usually 30-60 milliwatts of electrical power. For practical general lighting applications, higher power is generally required ($\geqq 1$ Watt), with operating currents beginning at 350 mA. While a conventional 60-100 watt incandescent lightbulb produces around 15 lumen per watt, advances in technology have produced white LED efficacy as high as between 131 Lm/W to 150 Lm/W, at 20 mA. In addition to being efficient, LEDs are also less expensive than standard, incandescent bulbs to manufacture, and the resulting light is stronger and even across the field of view because the LED lamp assembly reduces and effectively eliminates the diffraction pattern from standard, single bulb lamp assemblies, i.e., the alternating rings of bright and dim light are not present in multiple-LED lamp assemblies. The reliable, long-lasting, bright, clear light combined with low power utilization inherent in LED lamp assemblies make them highly desirable in motor vehicles.

An issue with lamp assemblies, of any type, on motor vehicles, is that motor vehicles are exposed to rapid temperature changes and inclement weather of many types, and this includes their lamp assemblies. Weather systems that involve ice, snow, freezing temperatures, and humidity pose a problem by hindering the luminous property of a lamp assembly by blocking the light from the exterior, such as covering the lamp with snow, or by blocking the light from the interior of the lamp, such as with condensation. It is inconvenient for a driver to continually wipe the snow, sleet and rain off the headlights of a vehicle and nearly impossible for a driver to remove the condensation on the interior of a light assembly without the time consuming process of completely disassembling the entire lamp. Numerous attempts have been made to address these issues. The following eighteen patents and published patent applications are relevant to the field of the present invention.

1. U.S. Pat. No. 1,816,299 issued to Luther E. Rynearson on Jul. 2, 1931 for "Glare Shield Attachment For Headlights" (hereafter the "Rynearson Patent");

2. U.S. Pat. No. 1,925,423 issued to William H. Warhus, Jr. et al. on Sep. 5, 1933 for "Headlight" (hereafter the "Warhus Patent");

3. U.S. Pat. No. 1,951,902 issued to John D. Dempsey on Mar. 20, 1934 for "Heater Attachment For Automobile Headlamps And The Like" (hereafter the "Dempsey Patent");

4. U.S. Pat. No. 3,364,381 issued to Rosena E. Porter on Jan. 16, 1968 for "Vehicle Safety Lights" (hereafter the "Porter Patent");

5. U.S. Pat. No. 3,406,282 issued to Harvey J. Kinch on Oct. 15, 1968 for "Headlamp Adapter Kit For Motor Vehicle" (hereafter the "Kinch Patent");

6. U.S. Pat. No. 4,728,775 issued to George A. Van Straten on Mar. 1, 1988 for "Indicator Light Cover For Vehicles And The Like" (hereafter the "Straten Patent");

7. U.S. Pat. No. 5,182,432 issued to Ulrich V. Lange et al. and assigned to Hella KG Hueck & Co. on Jan. 26, 1993 for "Crack Detector And Heating Circuit For Motor Vehicle Headlight Light Transmissive Shield" (hereafter the "Lange Patent");

8. U.S. Pat. No. 5,558,431 issued to Andrew V. Wilson and assigned to Novation Research, Inc. on Sep. 24, 1996 for "Replaceable Warning Light Lens Protector" (hereafter the "Wilson Patent");

9. U.S. Pat. No. 6,563,086 issued to Carl E. Meirndorf et al. on May 13, 2003 for "Vehicle Lights Defroster Device" (hereafter the "Meirndorf Patent");

10. U.S. Pat. No. 6,601,983 issued to Vincent A. Runfola et al. on Aug. 5, 2003 for "Led Vehicular Light Assembly With Heater" (hereafter the "Runfola Patent");

11. United States Published Patent Application No. 2004/0070339 issued Yoshihisa Suda et al. on Apr. 15, 2004 for "Vehicle Lamp" (hereafter the "Suda Published Patent Application");

12. United States Published Patent Application No. 2006/0011598 issued to Yuji Yasuda on Jan. 19, 2006 for "Vehicular Lamp" (hereafter the "Yasuda Published Patent Application");

13. United States Published Patent Application No. 2006/0104077 issued to Hirohiko Oshio et al. on May 18, 2006 for "Vehicular Lamp" (hereafter the "Oshio Published Patent Application");

14. United States Published Patent Application No. 2006/0232972 issued to Mitsuyuki Mochizuki on Oct. 19, 2006 for "Method For Manufacturing A Vehicular Lamp And A Vehicular Lamp" (hereafter the "Mochizuki Published Patent Application");

15. United States Published Patent Application No. 2006/0245202 issued to Cary Moreth et al. on Nov. 2, 2006 for "Vehicular Light Heater" (hereafter the "Moreth Published Patent Application");

16. United States Published Patent Application No. 2007/0025105 issued to Takashi Inoue et al. on Feb. 1, 2007 for "Vehicular Lamp" (hereafter the "Inoue Published Patent Application");

17. UK Patent Application No. 2,334,571 issued to Mark Rowalnd Yewman on Aug. 25, 1999 for "Light Fitting For A Vehicle Comprising Heating Element" (hereafter the "Yewman UK Patent Application");

18. Patent Abstract of Japan No. 2002150812 issued to Takahata Yoshihiro on May 24, 2002 for "Headlamp For Vehicle" (hereafter the "Yoshihiro Patent Abstract of Japan").

In reference to the Rynearson Patent, there is disclosed a glare shield for a headlight and the concept of incorporating a heating element into a glare shield. Specifically, the Rynearson Patent teaches a large semi-conical device having a base housing the heating means that is placed in front of the headlamp and is attached to the lens of the headlamp. The light from the headlamp passes through perforations in the base of the device to reduce the glare from the headlamp. The Rynearson Patent is big, bulky, unattractive, and significantly blocks the light from the headlamp, which light is particularly required during inclement weather when the device is to be used.

In reference to the Warhus Patent, there is disclosed a heating element within a headlamp for the purpose of melting snow and ice as it accumulates. The heating element is located within the headlamp and is placed between the light bulb and the outer lens. The heating element and the T-shaped brace that supports the heating element abuts the outer lens, and is unsightly and interferes with the appropriate illumination of the road during inclement conditions.

In reference to the Dempsey Patent, there is disclosed a heater attachment for automobile headlamps, which is placed over, around and in front of the lens of the headlamp. The heating element is a wire coil placed longitudinally in front of the headlamp, sandwiched between the lens of the headlamp and the lens of the Dempsey Patent.

In reference to the Porter Patent, there is disclosed specifically a taillight for vehicles with a heating element. The patent discloses a tail light having two incandescent light elements, one of which is of relatively high resistance and low illumination and can therefore function as both a heating and illuminating element. Further, this heating and illuminating element is directly connected to the ignition switch such that whenever the ignition switch is closed, i.e. the engine is on, the heating/lighting element is always on.

The Kinch Patent discloses an adapter designed specifically for the original 1960's Volkswagen Beetle automobile. The Kinch adapter is for after-market remodeling of the headlamp on the original Volkswagen Beetle to change the angle of the lamp, which can be from other manufacturers, from a position flush with the front bumper to a position wherein the face of the lamp is perpendicular to the street, which eliminates the glass shield that covered the sealed beam unit lamp and that easily freezes over. By removing this glass shield, by making the angle of the lens approximately 90 degrees from horizontal, and by using the ordinary heat generated from the normal operation of the sealed beam unit to function as a heater, the Kinch adapter is able to melt snow and ice from the headlamp and keep snow and ice off the headlamp.

The Van Straten Patent is an indicator light cover for vehicles which includes a heating element mounted to the cover. The heating element is placed in front of the illumination source and on the interior surface of the lens of the headlamp and is comprised of a flexible wire formed in concentric circular loops positioned in the grooves of the Fresnel-like lens that is the cover of the indicator light.

The Lange Patent discloses a crack monitoring system for the lens of a headlamp. The crack monitoring system has a secondary function of being a heating element for the headlamp having the heating element incorporated within the lens of the headlamp.

The Wilson Patent discloses an elongated lens, protector in the form of an attachment to the outer, leading surface of a lens of an emergency vehicle warning light located on the roof of the vehicle. A heating element can be added to the lens protector and resides on the exterior of the light between the lens of the emergency lights and the shield that is the lens protector.

The Meirndorf Patent discloses a cap for the tail lights of a school bus, covering the lens of the flashing lights of the bus and in which a heating element has been incorporated.

The Runfola Patent discloses a light assembly utilizing light emitting diodes, but the disclosed heating element is a two piece system by which a first heater, mounted on the board with the lights attaches to a second heating element mounted on the interior surface of the front lens.

The Suda Published Patent Application discloses a heating element added to the body of the vehicle lamp and which can be easily seen from outside the lamp.

The Yasuda Published Patent Application discloses a heating element embedded in the outer lens of the vehicular headlamp.

The Oshio Published Patent Application utilizes the heat from a single light emitting diode to melt ice and snow from the lens of the lamp.

The Mochizuki Published Patent Application discloses a headlamp having the heating element incorporated into the lens to melt snow and ice.

The Moreth Published Patent Application discloses a heating element that lies along the floor of the front cover of the light assembly.

The Inoue Published Patent Application discloses using gathering the heat from the light elements into a heat sink which is then brought forward to the lens to melt snow and ice.

The United Kingdom Published Application discloses a heating unit on the exterior surface of a lens of a headlamp.

The Yoshihiro Published Japanese Patent Application discloses a heating element that is printed on the lens to remove snow and ice deposits.

Generally, light assembly technology has been that of a sealed beam lamp of a single assembly, over which a front cover, usually of clear glass, is permanently attached. The sealed beam assembly, with the reflector, the front lens array and the bulb are all one unit that must be replaced together when the bulb burns out. The sealed beam lamp produces an intense oval pool of light with unfocused edges.

In addition, it can be seen that the prior art places a heating element in front of the light source, usually in a manner that impedes the light. The placement of a heating element in front of the light, in front of the lens or in front of the reflector plate, all have the same negative issues, that the result is usually ungainly and invariably unsightly light.

SUMMARY OF THE INVENTION

To resolve the problems of prior art vehicle light assemblies, the present invention is a unique and innovative combination of the placement of the heating element behind the reflector plate in such a manner that does not impede the light source and the optional addition of Fresnel lenses.

Fresnel or prism optics have the advantage of shifting parts of light laterally and vertically. When molded into a lens for a headlight, a Fresnel lens can significantly reduce the light scattering and provide a light distribution pattern of choice.

The present invention has a multiplicity of vehicular uses, and can be modified to be a headlamp, a tail lamp, a turn signal, a brake light, a dash board light, etc. However, its utility is not limited to vehicular use and can be further modified for use as a signal light, a street light, a flash light, an outdoor light, and as security lights. The present invention can be modified to fulfill the same uses a light is used in any industry. The flashlight industry, the aviation industry, on planes, on runways, and the maritime industry, on boats, buoys, docks, are just a few potential markets.

The present invention consists of five basic pieces, which, in order from top to bottom, are: a top cover, a reflector plate, a heating board, a light emitting diode (LED) board, and a bottom cover. The reflector plate has a multiplicity of light reflectors, one each to sit above and around each LED. The heating board has holes in it which fit around each light reflector and thus, the heating board can attach to the back side of the reflector plate without interfering with the light source and without being seen from the front. The back cover attaches to the top cover and has a means to bring power from outside the unit to the heating board and the LED board. The top cover has Fresnel lenses, such as one for each LED or one large pattern across the top cover. There are many types of Fresnel lens patterns. It can be seen, and this invention contemplates, a variety of lenses and lensing patterns, as well as having the Fresnel lenses along the exterior surface or along both the exterior surface and the inner surface.

The reflector plate is made of any light weight, heat conducting metal, such as aluminum, or any other heat conducting material. The light reflectors may be treated to increase or enhance the reflection of the light outwardly. Further the light reflectors may be shaped or grooved to help achieve this effect. The design of the light reflectors in the preferred embodiment is of a generally inverted, hollow, right circular cone, cut off below its peak, known as a frustum in singular and frusta in plural. However, for purposes of the light assembly the frusta need not be at right angles; the angle of the frustum may be varied to angle the light differently.

While the present invention contemplates that the method to attach the heater plate to the reflector plate is with screws and nuts, other means may be used, such as clips, epoxy, adhesives, and grooves in the reflector plate.

The heating board in the present invention includes a pre-programmed thermostat and sensor to activate and deactivate the heating elements. Different models of this light assembly can be made with different temperature ranges for various climates and uses. The heating board is controlled by a microcontroller. This microcontroller is connected to an NTC temperature sensitive resistor, also called a thermistor, from which it can receive information regarding the ambient temperature. The microcontroller is preprogrammed with a temperature range, below which the microcontroller will activate the heating board and above which the microcontroller will deactivate the heating board. Also, the microcontroller can deactivate the heating board after a lapse of a certain amount of time, which is programmed into the microcontroller. A combination of both temperature limits and time duration are contemplated by this patent. For example, the microcontroller can be programmed to activate the heating board when the ambient temperature falls below 5° C. and would deactivate after fifteen minutes or when the ambient temperature reaches 10° C., whichever comes first. Another example is that the heating board can be activated when it falls below a given temperature and remain activated until the time period has elapsed regardless of the ambient temperature. Different temperature ranges and different heating time periods can be pre-programmed into the microcontroller so as to have various light assembly models to suit the various needs of a particular region's weather conditions and seasons and the requirements of the consumer.

It has been discovered, according to the present invention, that if a heating board is positioned within a light assembly of a vehicle which includes a lens cover and lenses to direct the beam of light from the light assembly, and which heating board is positioned within a lens housing and behind the lens and in front of the source of illumination within the housing, and the heating board comprises a sensor to turn the heating board on after the outside temperature has declined to a certain level, then the heating board will generate sufficient heat to defrost and otherwise remove snow and fog from the lens. This sensor may be located on the heating board, on the reflector plate, along the interior of the top cover or any location in and around the light assembly that is appropriate to sense the temperature.

It has further been discovered, according to the present invention, that if the light assembly is connectable to a pony-tail connection from the vehicle, then, once connected, the light assembly is powered by the electrical power from the vehicle so that the heating assembly will automatically operate to clear the lens from snow and other cold weather element matter on and within the lens of the light assembly.

It has additionally been discovered, according to the present invention, that if a lens assembly of a vehicle comprises a heating board within it which is powered by the electrical system of the vehicle, and if the heating board connects to a sensor which activates the heating board to generate heat within the lens assembly after a predetermined temperature external to the lens assembly has been achieved, then the heating board will enable cold element effects on the lens to be reduced to enable a beam of light from the lens assembly to shine unobstructed through the lens.

It is therefore an object of the present invention to provide a heating board which is positioned within a light assembly of a vehicle which includes a lens cover and a lens to direct a beam of light from the light assembly, and which heating board is positioned within a lens housing and behind the lens and in front of the source of illumination within the housing, the heating board having means to enable the source of light to shine through the heating board, and the heating board comprises a sensor to turn the heating board on after the outside temperature has declined to a certain level, then the heating board will generate sufficient heat to defrost and otherwise remove snow and fog from the lens.

It is a further object of the present invention to provide a light assembly which is connectable to a ponytail connection from the vehicle so that once connected the light assembly is powered by the electrical power from the vehicle so that the heating assembly will automatically operate to clear the lens from snow and other cold weather element matter on and within the lens of the light assembly.

It is an additional object of the present invention to provide a lens assembly for a vehicle which comprises a heating board within it which is powered by the electrical system of the vehicle, and if the heating board connects to a sensor which activates the heating board to generate heat within the lens assembly after a predetermined temperature external to the lens assembly has been achieved, then the heating board will enable cold element effects on the lens to be reduced to enable a beam of light from the lens assembly to shine unobstructed through the lens.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Figure 1:
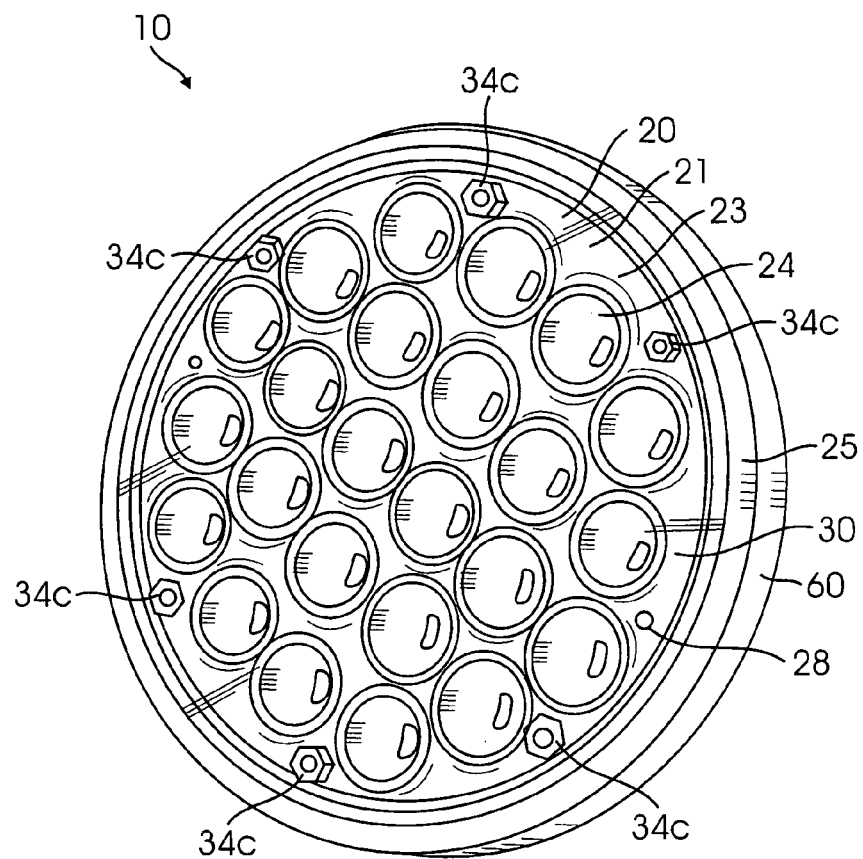
FIG. 1 is a front perspective view of the assembled light assembly in accordance with a preferred embodiment of the present invention.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring now to the drawings, FIGS. 3-4 and 6-8b, inclusive, there is shown a light assembly 10 of the invention comprising two exterior elements, a top cover 20 and a bottom cover 60, and three interior elements, the reflector plate 30, the heating board 40, and the LED board 50. In general, the three interior elements, the reflector plate 30, the heating board 40, and the LED board 50, sandwiched together and which lie snugly within the exterior elements, top cover 20 and bottom cover 60.

Top cover 20 is either made entirely of a transparent material, preferably a hard plastic, or has at least the face 23 made of a transparent material, preferably a hard plastic. On the face 23 of the top cover 20 are a multiplicity of Fresnel lenses 24, one each to correspond with an LED and has a diameter to correspond to the base 33b of each conic frustum 33 on the reflector plate 30. The exterior surface 21 of the top cover 20 is a smooth, flat surface and the interior surface 22 is the surface on which the Fresnel lenses 24 reside. It can be seen, and this invention contemplates, a variety of lenses and lensing patterns, as well as having the Fresnel lenses 24 along the exterior surface 21, or along both the exterior surface 21 and the inner surface 22.

The top cover 20 removably attaches to bottom cover 60. While there are many methods by which this may occur, the preferred embodiment, utilizes a double flange method, wherein two concentric collars, peripheral collar 25 and inner collar 26, lie perpendicular to the interior surface 22 of the face 23 of the top cover 20. The peripheral collar 25 lies along the verge of the circumference of the face 23 of the top cover 20 and projects downwardly so that the height of the peripheral collar 25 lies generally entirely below the face 23 of the top cover 20. The inner collar 26 is of a smaller diameter than the peripheral collar 25 and also projects downwardly from the interior surface 22 of the face 23 of the top cover 20. The inner collar 26 is proximally located to the peripheral collar 25. The inner collar 26 and the peripheral collar 25 create a narrow channel between them of a width to permit the close fitting or friction fitting of the rim 64 of circumferential wall 63 of the bottom cover 60. This fitting allows the inner collar 26 to lie along the interior surface 62 of the circumferential wall 63 of the bottom cover 60 and the peripheral collar 25 to lie along the exterior surface 61 of the bottom cover 60.

The top cover 20 is releasably secured to the bottom cover 60, by a snap fit utilizing a spine 29 encircling the peripheral collar 25 along the side of the peripheral collar 25 that abuts the exterior surface 61 of the circumferential wall 63 of the bottom cover 60, and that snaps over a ridge 65 running along the exterior surface 61 of the circumferential wall 63 of the bottom cover 60.

The heat conducting reflector plate 30 is made of a light weight, heat conducting metal, such as aluminum, or any other heat conducting material, having a face 31 and a back 32. The face 31 of the heat conducting reflector plate 30 faces outwardly towards the top cover 20. The back 32 of the reflector plate faces towards the bottom cover 60. Reflector plate 30 has either machined or molded into it a plurality of hollow frusto-conical reflectors 33. Each frusto-conical reflector 33 is generally a hollow, right circular cone, however, the angle of the frusto-conical reflector 33 may be varied to angle the light differently. The frusto-conical reflectors 33 is arranged on the heat conducting reflector plate 30 such that each frusto-conical reflector base 33b is facing and level with and forms into the face 31 of the heat conducting reflector plate 30. The base 33b of each frusto-conical reflector 33 may have beveled edge 33c.

Also in reflector plate 30 is attachment means 34 by which the heater plate 40 is affixed, removeably or fixedly, to reflector plate 30. The attachment means includes at least one pair of a screw 34b and complimentary mating helix 34a. Complimentary mating helix 34a is tapped in the material of the reflector plate 30.

The heating board 40 has a face 41 and a back 42. The face 41 of the heater board 40 faces outwardly towards the top cover 20. The back 42 of the heater board faces towards the bottom cover 60. The heating board 40 has a plurality of apertures 47, one for each frusto-conical reflector 33, and are aligned with each frusto-conical reflector 33 so that each frusto-conical reflector 33 passes through its corresponding aperture 47 and the heating board 40 rests part way along the frusto-conical reflector 33 and on the complimentary mating helix 34a. The heating board 40 has a multiplicity of eyelets 46, one each to correspond with each mating helix 34a. Screw 34b passes through eyelet 46 to screw into mating helix 34a and extend through to the face 31 of the heat conducting reflector plate 30 and may be held with nut 34c on the face 31 of heat conducting reflector plate 30, thereby releasably affixing heating board 40 to the back 32 of the heat conducting reflector plate 30.

Heating board 40 contains electronic components 44 to control heating elements 43. Among the electronic components 44 is a microcontroller 84 which is preprogrammed with the temperature at which heating elements 43 are activated and the temperature at which heating elements 43 are deactivated. An NTC temperature sensitive resistor, thermistor, 94 is used as a sensor to detect the ambient temperature and send that information to microcontroller 84. Thermistor 94 may be located on the heating board 40, on the reflector plate 30, along the interior 22 of the top cover 20 or any location in and around the light assembly 10 that is appropriate to sense the temperature. The electronic components 44 of the heating board 40 are powered by connecting means 44c that connect to the LED board 50.

In and around the apertures 47, the eyelets 46, and all the electronic components 44 are the heating elements 43, effectively covering the remaining surface space of the face 41 of the heating board 40. When heating elements 43 are activated, the ambient heat warms the back 32 of reflector plate 30. The frusta 33 not only perform as reflectors for each individual LED 53 on the LED board 50, but also as conductors of the ambient heat generated from the back face 42 of the heating board 40. As a fairly large surface area of the frusta 33 project through the apertures 47 of the heating board 40, heat absorption and transfer will be greater, more efficient and occur more quickly. The transfer of the ambient heat from heating board 40 behind the reflector plate 30 to the front face 31 of the reflector plate 30 warms the top cover 20 of the light assembly.

LED board 50 has a face 51, facing toward the top cover 20, and a back 52, facing toward the bottom cover 60. LED board 50 has a multiplicity of light emitting diodes, LEDs, 53, one each to correspond and align with each frustum 33. LED board 50 has its own set of electronic components 54, to power the LEDs 53. LED board 50 has electrical connectors 55 that have a dual purpose. The first purpose is to connect at the electrical connector base 55b from the back 52 of LED board 50 with the power connector 66 on the bottom cover 60, thus providing power to the LED board 50. Power is brought to the light assembly 10 through the exterior surface 61 of the bottom cover 60 where the power connector 66 extends through from the interior surface 62 to finished plugs 66a on the exterior surface 61 of the bottom cover 60. The second purpose of electrical connectors 55 is to mate with connecting means 44c on the heating board 40 and thus provide power to the heating board 40. This is done by connecting means 44c coming in contact with at least the electrical connector top 55a. It will be noted that electrical connectors 55 need not be wired to connecting means 44c on the heating board. Connecting means 44c may be pads which electrical connectors 55 touch and thereby power the heating board 40. LED board 50 rests upon risers 67 that extend upwardly from interior surface 62 of the bottom cover 60.

To aid in the proper assembly and alignment of all these elements, most elements of the light assembly 10 have an alignment means. While this may take many forms, in the present invention the alignment means 27 for the top cover 20 consists of an alignment ridge 27a transversing the interior surface 22 along the height of the inner collar 26 and extending centrally from the interior surface 22 of the inner collar 26. The alignment means 27 of the top cover 20 mates with the alignment means 35 of the reflector plate 30. The alignment means 35 of the reflector plate 30 consists of an alignment notch 35a into which the alignment means 27 of the top cover 20 fits. The alignment means for the heating board 40 consists of either one or both the singular way to fit the heating board 40 over the conic frusta 33 of the reflector plate 30 and the singular way the eyelets 46 align with the complimentary mating helix 34a for the screws 34b to affix the heating board 40 to the reflector plate 30. The alignment means 56 for the LED board 50 consists of guiding holes 56a, one each for the alignment rods 68a, which guide the first alignment means 68 of the bottom cover 60. The alignment means 68 of the bottom cover 60 consists of a plurality of alignment rods 68a extending upwardly from the interior surface 62 of the bottom cover 60. The bottom cover 60 has a second alignment means 69 which aligns the top cover 20, the reflector plate 30 and the attached heating board 40 over the LED board 50 and the bottom cover 60. The second alignment means 69 of the bottom cover 60 consists of a notched panel 69a rising from the interior surface 62 of the bottom cover 60. The notched panel 69a resides on the interior surface 62 at a distance from the circumferential wall 63 so as to correspond and mate with the alignment ridge on the inner collar 26 of the top cover 20. The alignment notch 35a of the reflector plate 30 resides over the cleft 69b in the notched panel 69a. For assembly, the alignment ridge 27a of the top cover 20 passes through the alignment notch 35a of the reflector plate 30 and continues down through the cleft 69b in the notched panel 69a on the bottom cover 60. As discussed earlier, the inner collar 26 of the top cover 20 abuts the interior surface 62 of the bottom cover and the peripheral collar 25 of the top cover 20 closely fits along the exterior surface 61 of the bottom cover, thus the circumferential wall 63 of the bottom cover 60 lies in the channel between the inner collar 26 of the top cover 20 and the peripheral collar 25 of the top cover.

Referring to FIG. 1, there is shown a front perspective view of a preferred embodiment of the light assembly 10. Top cover 20 has a face 23 which is transparent and through which it can be seen that the Fresnel lenses 24 are aligned over the frusta bases 33b of the reflector plate 30. Also seen, although distorted by the Fresnel lenses 24 are the tops of the LEDs 53. A few spacers 28 are incorporated into the face 23 of the top cover 20 so as to allow room for the screws 34b on the face 31 of the reflector plate 30 without the screws 34b being pressed against the interior surface 22 of the top cover. It can also be seen that the exterior surface 21 of the peripheral collar 25 resides over a portion of the exterior surface 61 of the circumferential wall 63 of the bottom cover 60.

Figure 2:
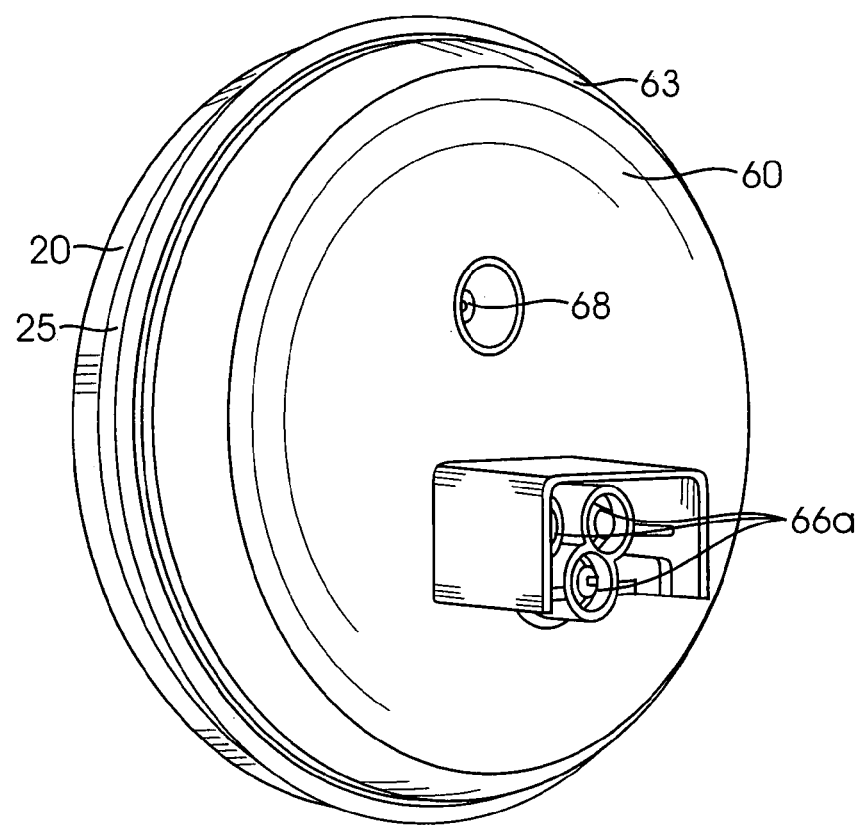
FIG. 2 is a rear perspective view of the assembled light assembly in accordance with a preferred embodiment of the present invention.

Referring to FIG. 2, there is shown a perspective view of the back of a preferred embodiment of the light assembly 10. The exterior surface 61 of the bottom cover 60 can be seen, as well as the finished plugs 66a on the exterior surface 61 which become the power connector 66 inside the light assembly 10. As shown in the preferred embodiment, these finished plugs 66a are designed to mate with a ponytail connector from the truck for vehicular use. It can be seen that other types of plugs and power connectors may be utilized as finished plugs 66a to bring power to the light assembly and may vary to accommodate the use of the light assembly 10.

Figure 3:
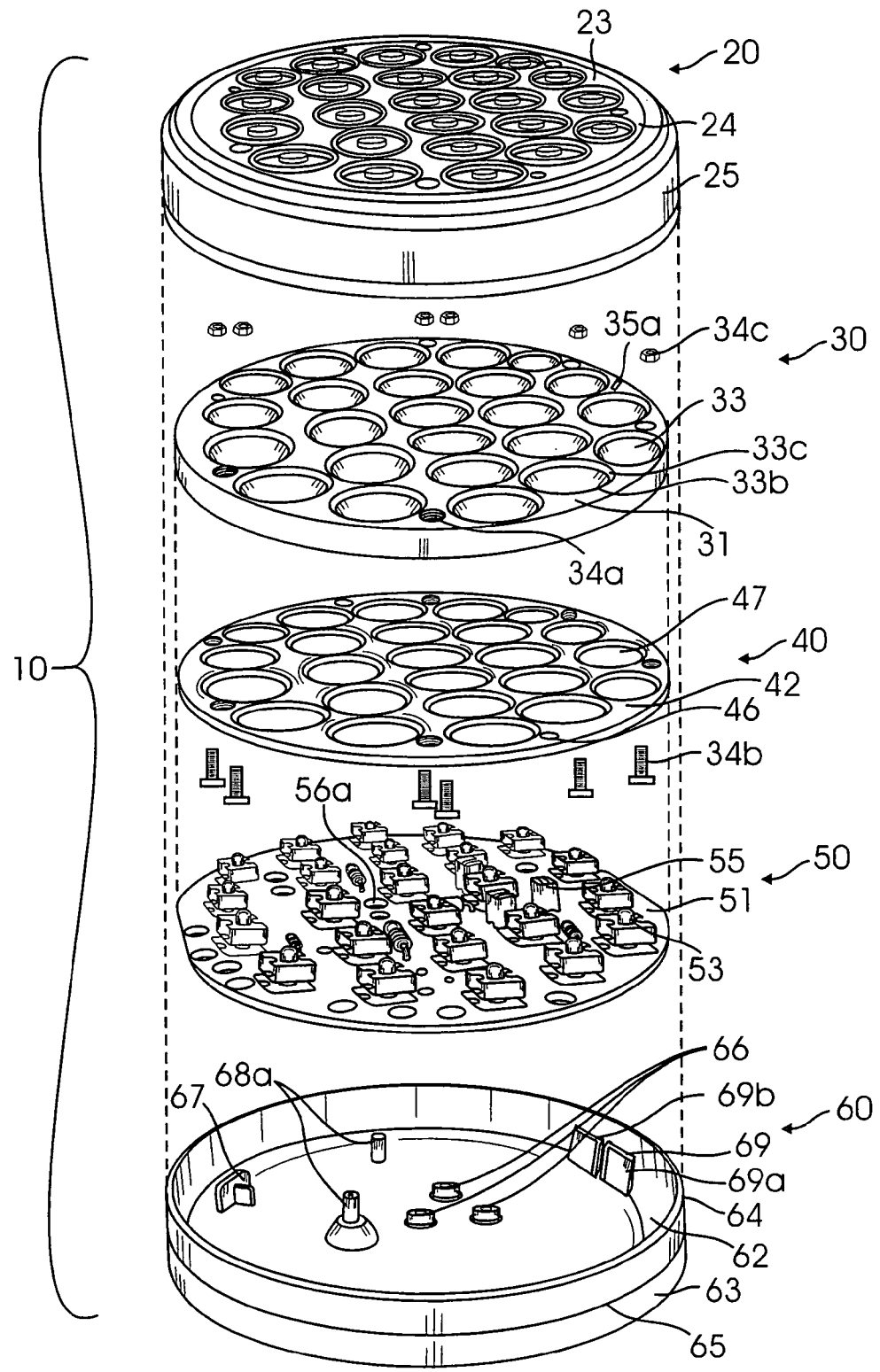
FIG. 3 is an exploded perspective view of a preferred embodiment of the present invention light assembly shown as viewed from the top.
Figure 4:
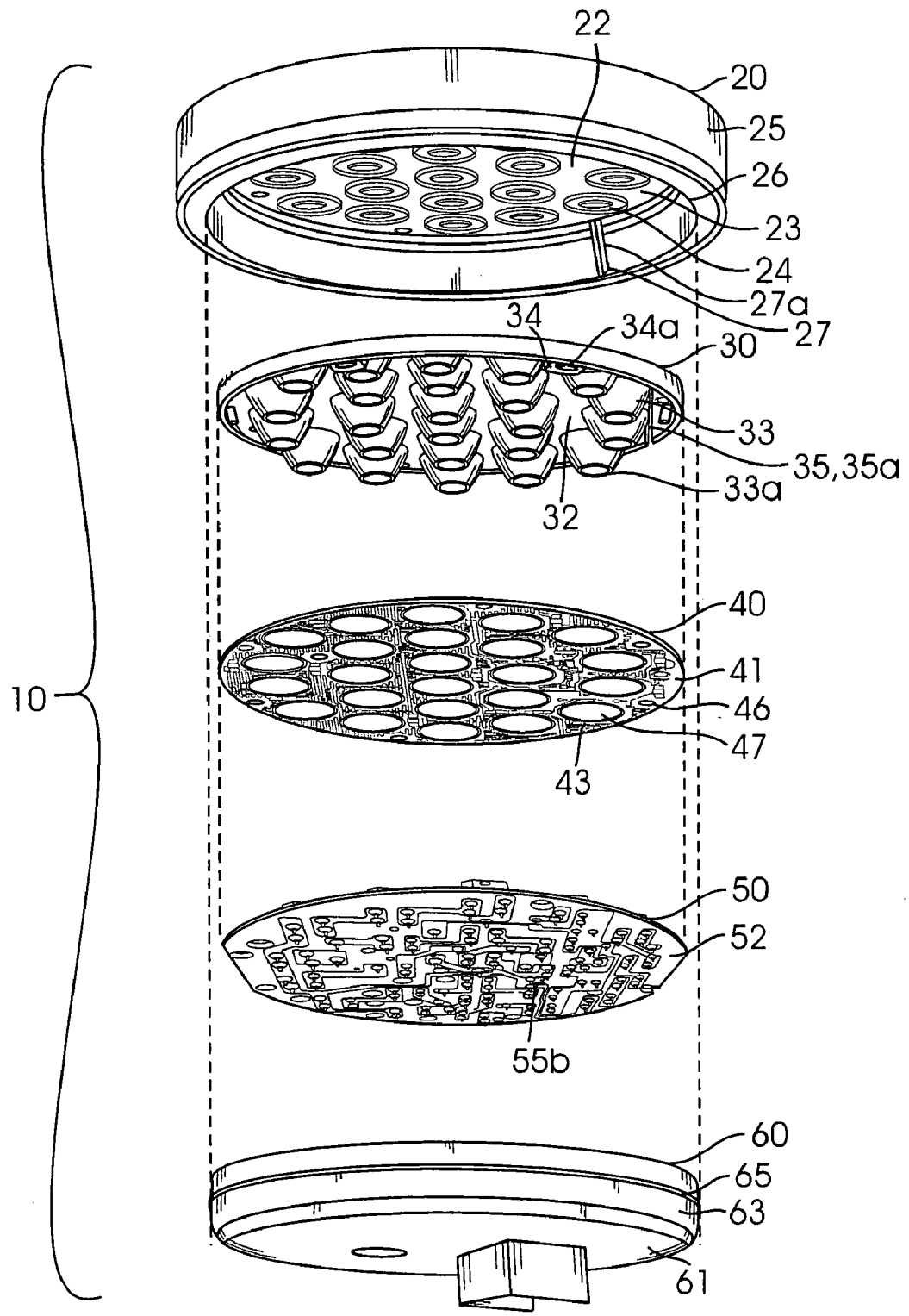
FIG. 4 is an exploded perspective view of a preferred embodiment of the present invention light assembly shown as viewed from the bottom.

There is also shown in FIGS. 2 and 3 the bottom of the alignment rod 68a as it rises from the interior surface 62 of the bottom cover 60. The peripheral collar 25 of the top collar 20 can also be seen as it closely fits and releasably attaches to the bottom cover 60.

Figure 5:
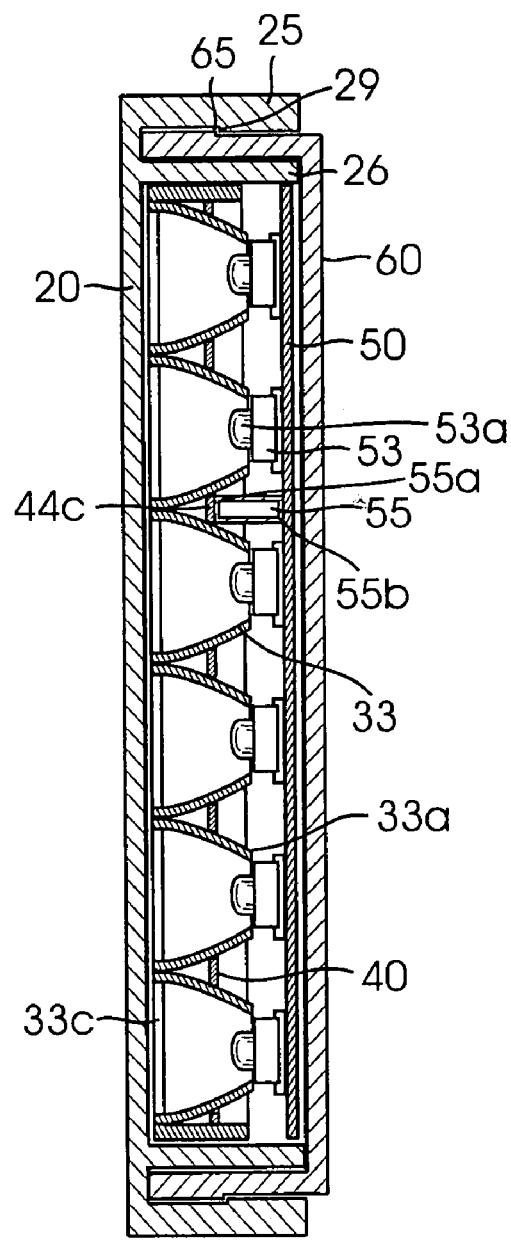
FIG. 5 is a cross-sectional elevation view of the assembled invention in accordance with a preferred embodiment of the present invention, the view illustrating the five components assembled together and illustrating at least one connection from the LED board touching and connected to the heating board so as to provide power to the heating board.
Figure 6:
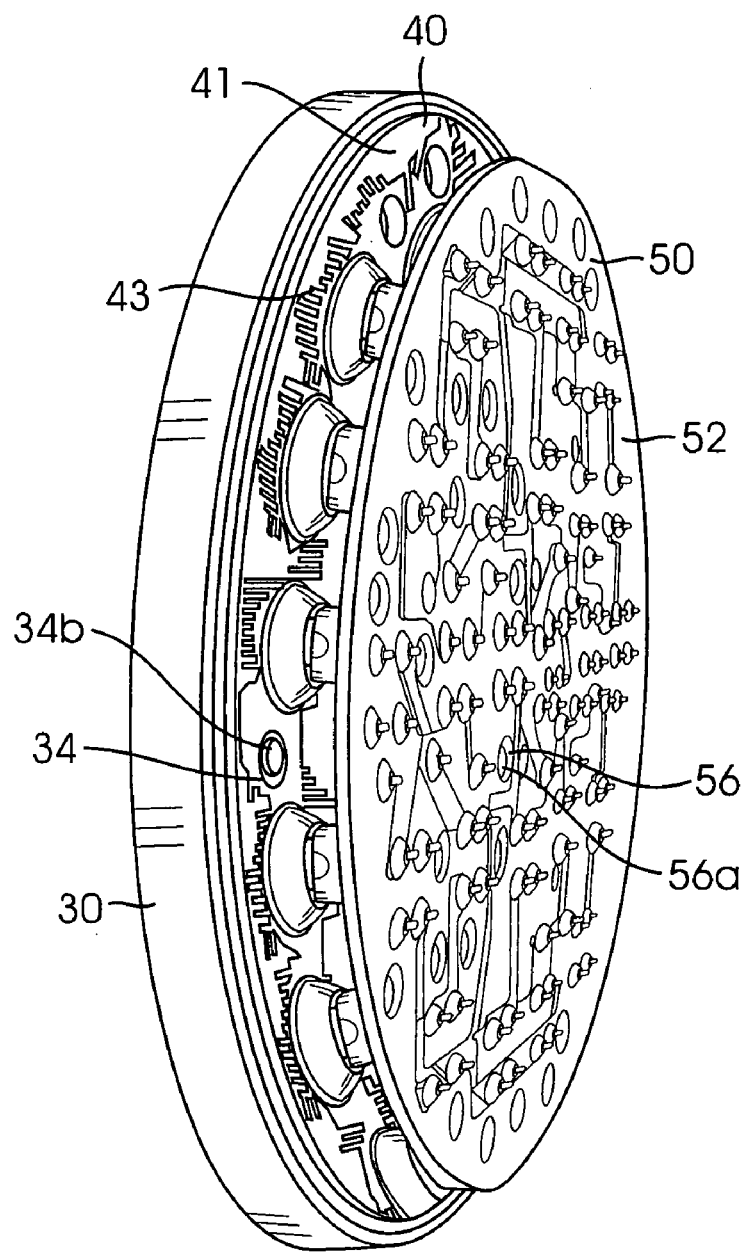
FIG. 6 is a perspective view of a partial assembly of the light assembly illustrating the assembly of the reflector board, the heater board and the LED board in accordance with a preferred embodiment of the present invention.

Referring specifically to FIG. 5, there is shown a general scheme of the assembled framework of the light assembly 10. In general, in a bottom cover 60 there resides an LED board 50, a heating board 40, and a reflector plate 30. The LED board 50 is facing towards the top cover 20. The heating board 40 has its heating elements 43 under the reflector plate 30 and facing downwardly towards the LED board 50. Over the entirety resides a top cover 20. The reflector plate 30 has a multiplicity of conic frusta 33, having a base 33b, that can be beveled 33c, and that resides along the face 31 of the reflector board 30. Each conic frustum 33 extends downwardly so that its planed top 33a resides over the lens 53a, of an LED 53 so as to reflect the light up and through the Fresnel lens 24 of the top cover 20. Above the LED board 50 and surrounding the conic frusta 33 on the face 31 of the reflector plate 30 is the heating board 40. The heating board 50 has a multiplicity of apertures 47 through which the frusta 33 pass. The heating board 40 should have at least one aperture 47 for each frustum 33; the reflector plate 30 should have a quantity of frusta 33 equal to the quantity of LEDs 53. The apertures 47 of the heating board, the frusta 33 of the reflector plate 30 and the location of the LEDs 53 should all line up in a manner consistent with FIG. 5.

FIG. 5 also illustrates that there exists some connecting means 44c on the heating board 40 to the LED board 50, which in the present instance is the top 55a of an electrical connector 55 that rises from the LED board 50 to connect with the heating board 40 at the connector's top 55a.

Figure 11:
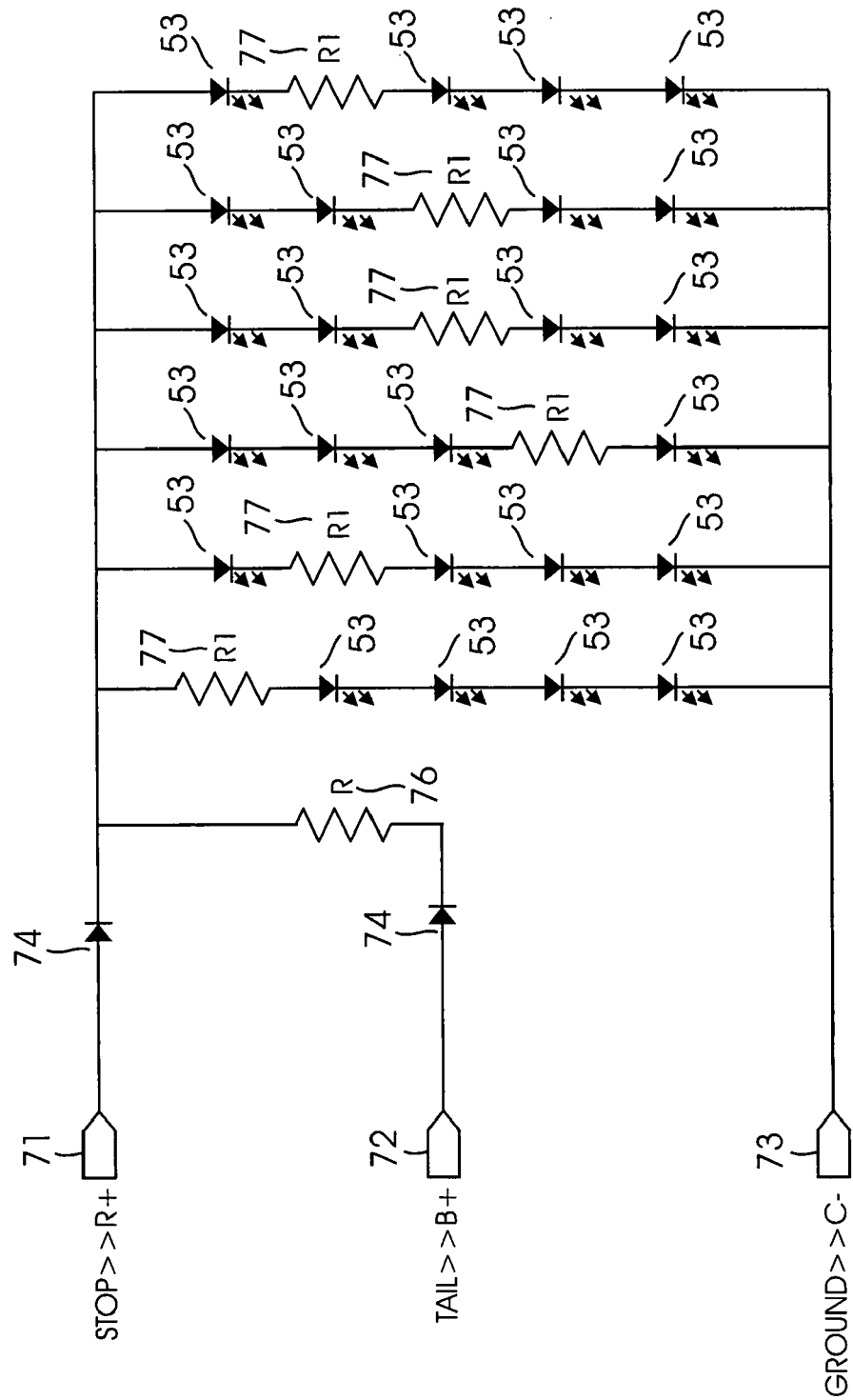
FIG. 11 is a schematic of the LED board in accordance with a preferred embodiment of the present invention.

Referring to FIGS. 7A, 7B, 7C, and 11, there is illustrated the LED board and its corresponding schematic diagram of the power circuits and the electrical circuitry portion of a preferred embodiment of the present invention. Referring to FIG. 11, there is shown one possible schematic for the LED board 50. Other configurations having the same effect are within the contemplation of this patent. In the power circuits, the line, neutral and ground conductors are brought to the unit by connection through the finished plugs 66a (of FIG. 2), then to the electrical connectors 55 of the LED board 50 and then connected to nodes 71 and 72 to supply 12VDC to the LED board components. Node 73 is ground. Nodes 71, 72 and 73 are in parallel. Power line node 71 is connected to a diode 74. Power line node 72 is also connected to a diode 74 and is in parallel with power line node 71 and another diode 74, and connected by a resistor 76, which may be rated, in this example, at 220 ohms. Connected along the power line following node 71 are a multiplicity of lines in parallel, comprised, in this example, of a resistor 77, which may be rated, in this example, at 66 ohms, and a multiplicity of LEDs 53. In this example, each parallel line has one 66 ohm resistor 77 and four LEDs 53. As mentioned above, power to these parallel lines is provided by each connecting off of power line of node 71 at one end and each attaching to ground line node 73 at their other ends.

Figure 7A:
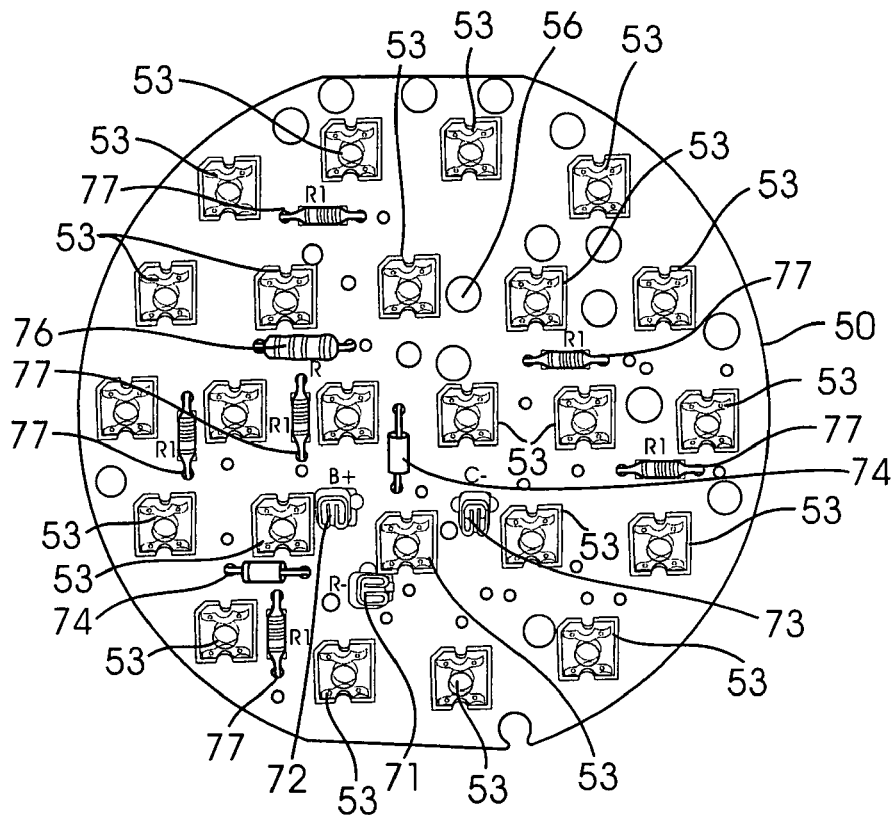
FIG. 7A is a top plan view of the recto or front side of the printed circuit LED board in accordance with a preferred embodiment of the present invention.
Figure 7B:
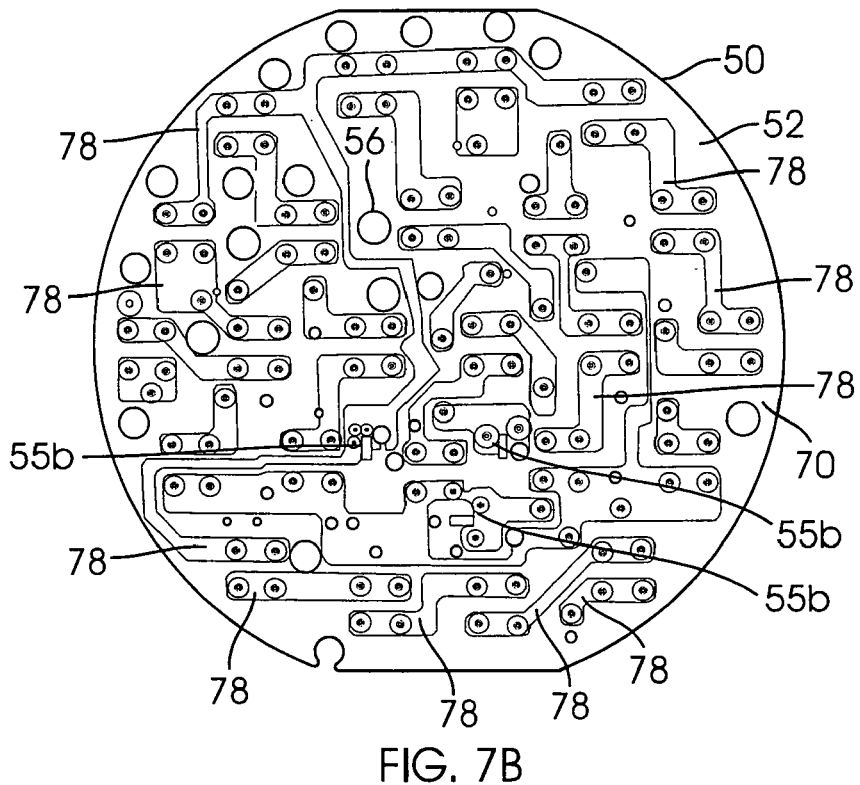
FIG. 7B is a plan view of the verso or back side of the printed circuit LED board in accordance with a preferred embodiment of the present invention.
Figure 7C:
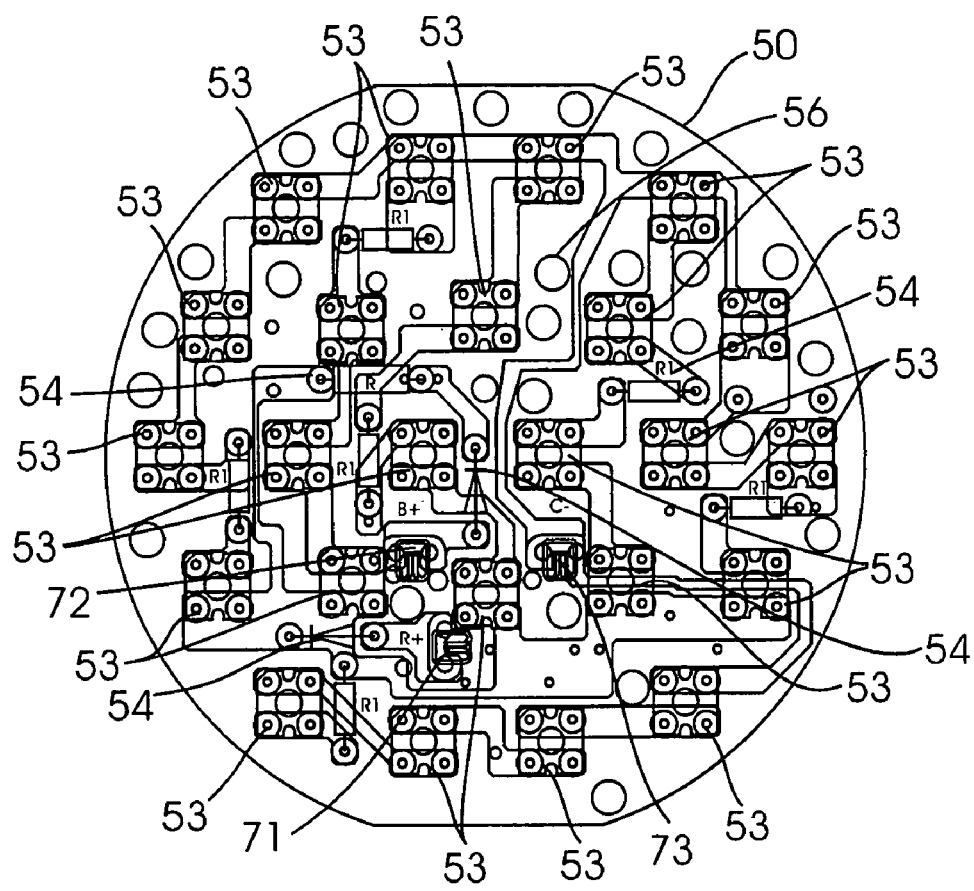
FIG. 7C is a wiring schematic view from the recto or front side of the printed circuit LED board in accordance with a preferred embodiment of the present invention.

Continuing with FIGS. 7A, 7B, 7C, and 11, the LED board components may be arranged according to the schematic diagram shown in FIG. 11 in numerous arrangements. FIGS. 7A, 7B, and 7C show one method, by way of example, utilizing a printed circuit board 70 for the LED board 50. FIG. 7A is the recto of the printed circuit board 70. The twenty-four LEDs 53, six 66 ohm resistors 77, the single 220 ohm resistor 76, the two diodes 74, and the three nodes, 71, 72, and 73 are attached to this side of the board. FIG. 7B shows the verso of the printed circuit board 70. On the verso of the printed circuit board 70, there can be seen the soldered prongs of the LED board components. There can also be seen the printed circuit lines 78 that connect each of the LED board components. It should be noted that the soldered prongs of power line nodes 71 and 72 and ground line node 73 connect, from the verso of the LED board 50, connect with the power connector 66 and finished plugs 66a of the bottom cover 60, (see FIGS. 2 and 3). FIG. 7C is an illustrative example showing both sides of the printed circuit board 70 of the LED board simultaneously.

Figure 8A:
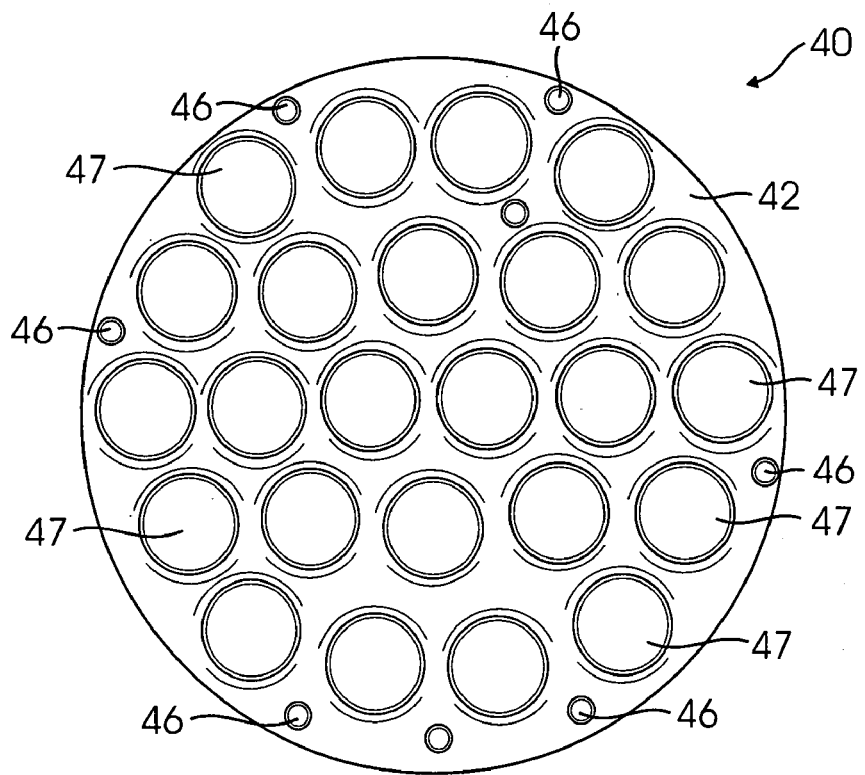
FIG. 8A is a plan view of the recto or front side of the printed circuit heating board in accordance with a preferred embodiment of the present invention.
Figure 8B:
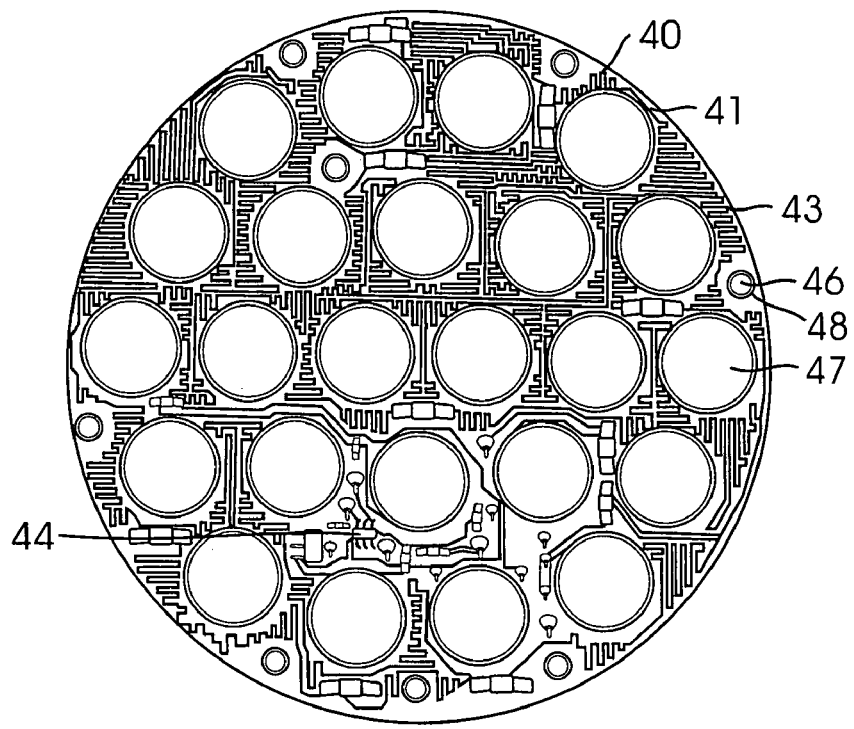
FIG. 8B is a plan view of the verso or back side of the printed circuit heating board in accordance with a preferred embodiment of the present invention.

Referring to FIGS. 8A and 8b, there is illustrated that the back 42 of the heating board 40 has no heating elements 43 or electrical components 44 on it in the preferred embodiment and that the face 41 of the heating board 40 contains all the heating elements 43 and electrical components 44. Alternate embodiments may include having the portion of the heating board 40 that faces the reflector plate 30 with some or all of the heating elements 43 or electrical components 44.

Figure 9:
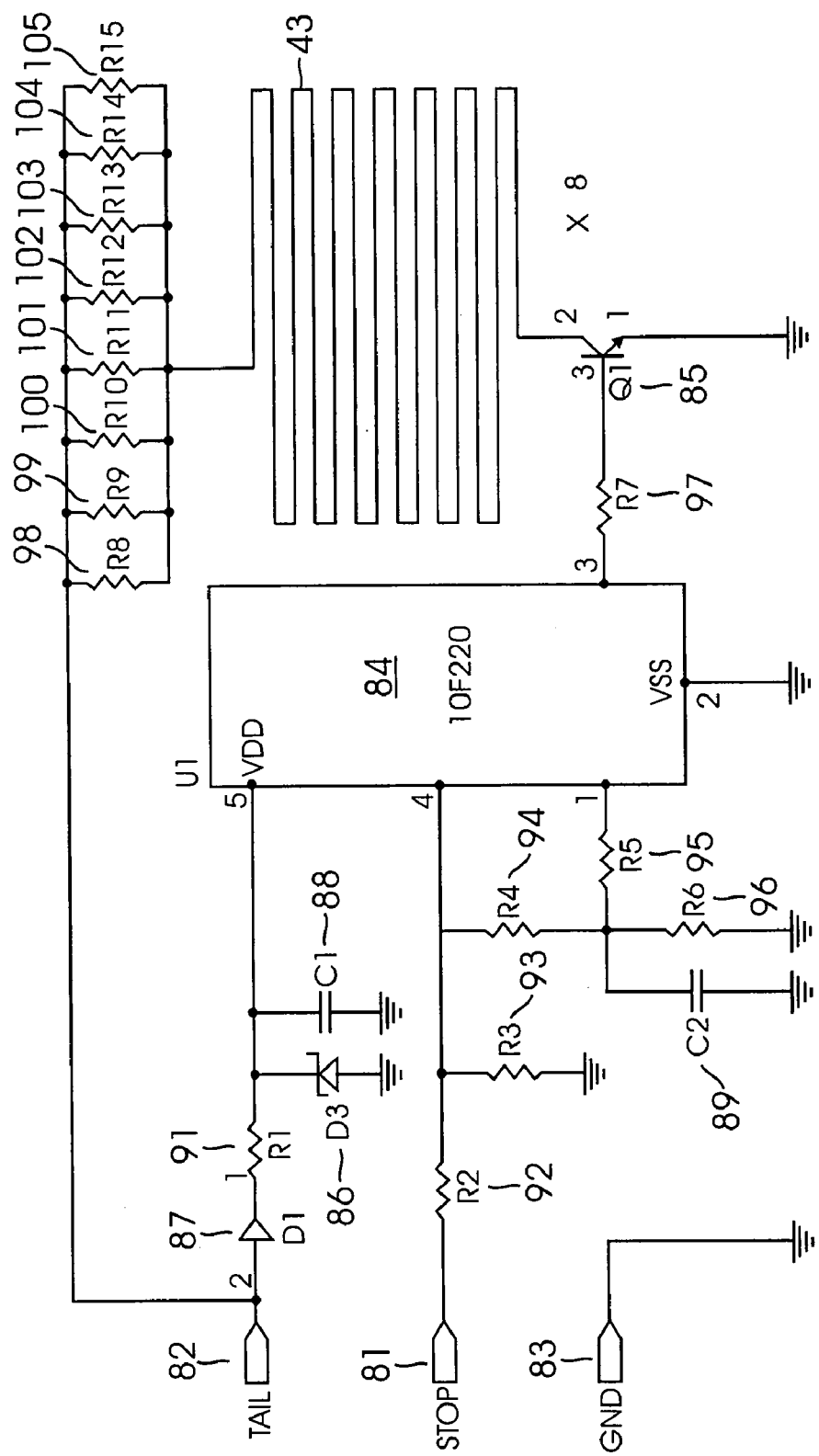
FIG. 9 is a schematic of the heating board in accordance with a preferred embodiment of the present invention.

Referring to FIG. 9, there is shown a schematic of the heating board 40. While the schematic specifies a particular microcontroller 84, it should be noted that other makes and models and components of the various electronic components 44 are contemplated within the scope of this patent. By way of example, the heating board 40 is also a printed circuit board 80. In the power circuits, the nodes 81, 82, and 83 connect to the nodes 71, 72 and 73, respectively, of the LED board 50. The three nodes 81, 82 and 83 are in parallel. Node 82 and transistor 85 provide positive power to the microcontroller 84. Node 83 goes to ground. A microcontroller 84 controls the heating board. Pin 5 of the microcontroller is in series with capacitor C1, 88, zener diode 86, resistor R1 91, and diode 87. Zener diode 86 and capacitor C1 go to ground. Diode D1 87 keeps the power from flowing out of capacitor C1 88 if the light voltage dips or is noisy. The zener diode 86 passes enough current through resistor, R1 91 to keep the voltage drop so there is only 5 v at the microcontroller 84 pin 5. Node 81 is in series with resistor R2 92 and resistor R3 93 and to pin 4 of the microcontroller 84. Resistor R3 93 goes to ground. Resistors R2 92 and R3 93 are acting as a voltage divider so the node 81 signal is limited well below 5V. Additionally, pin 4 tells the microcontroller 84 when node 81 is energized. A temperature sensitive resistor 94, also called a thermistor, R4 connects pin 4 to the circuitry off of pin 1. Both pin 4 and pin 1 are tied to an A/D converter. The circuitry off of pin 1 acts as a thermostat for the heating elements 43. Thermistor 94, bridges pin 1 and pin 4 of the microcontroller 84 and senses the ambient temperature, which information is received by microcontroller 84. Microcontroller 84 activates the heating board 40 when the thermistor 94 detects temperature below a preprogrammed temperature limit and will deactivate the heating board 40 when either thermistor 94 detects temperature at or above an upper limit preprogrammed into the microcontroller 84 or when a pre-set time duration, which has been preprogrammed into the microcontroller 84, has elapsed. When node 81 is energized capacitor C2 89 charges to some voltage, which then discharges slowly. Pin 3 drives transistor Q1 which lets heater current flow. The circuitry from pin 3 to pin 5, with resistors 98, 99, 100, 101, 102, 103, 104, and 105, which partly comprise the heating elements 43, transistor 2 and resistor 97 are in the formation of a standard electronic switch in the grounded emitter configuration. Pin 2 of the microcontroller 84 simply goes to ground.

Figure 10:
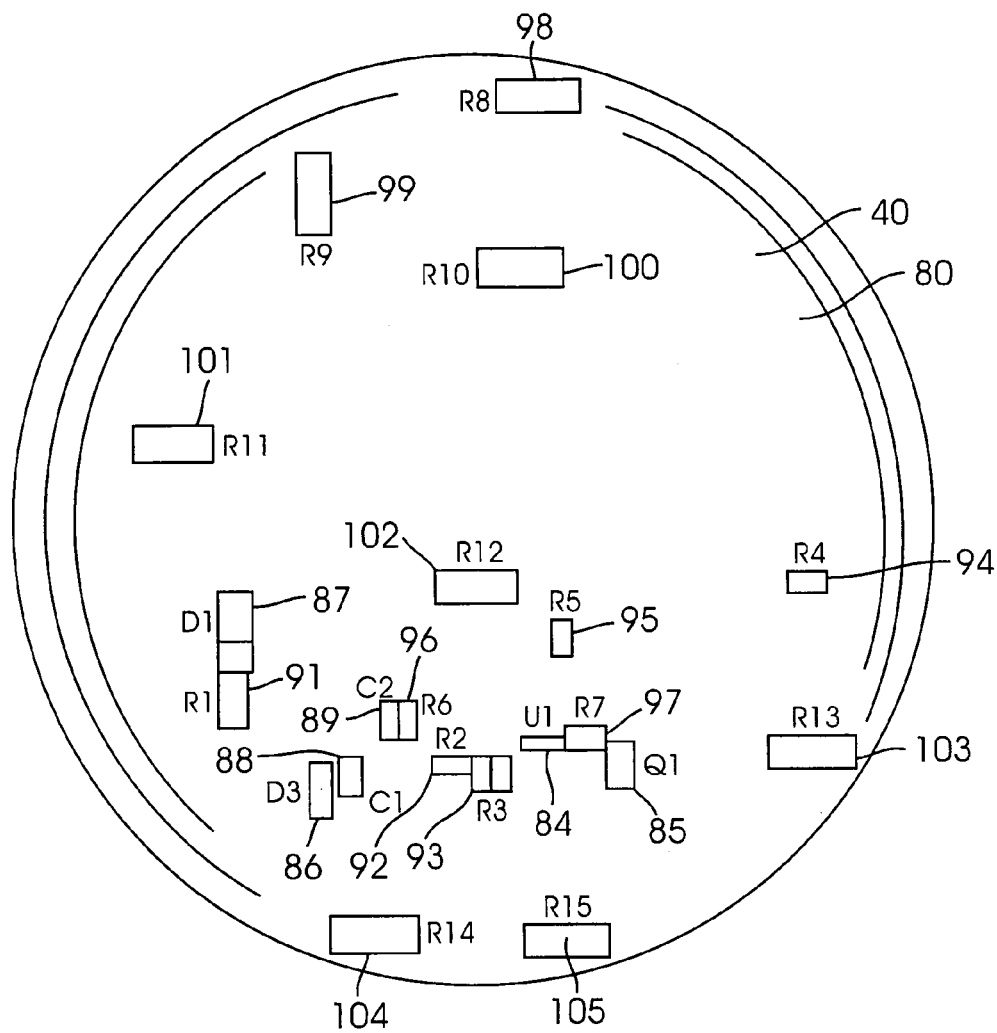
FIG. 10 is a mirror image of a top plan layout of the footprint of the printed circuit heating board in accordance with a preferred embodiment of the present invention.

Referring to FIG. 10, there is shown one possible footprint of the electronic components 44 of the heating board 40. In the preferred embodiment, the mirror image along a tangent vertical line, of this footprint was used for the heating board 40.

Defined in detail, the present invention is a light assembly device for attaching to a motor vehicle and providing an efficient light source and a non-intrusive heating element to remove and reduce the effects of inclement weather comprising: (a) an electronic circuit board having a multiplicity of light emitting diodes, a corresponding circuitry, a power connector means, and an alignment means, the power connector means enabling the providing of power to the electronic circuit board and a heating board; (b) a heating board having a front surface, a back surface, a microcontroller, electronic components, a sensor, heating elements, a connecting means, apertures, eyelets, and alignment means, the sensor enabling the sensing temperatures, the microcontroller enabling the activating and deactivating of the heating elements, the number of apertures at least equal to the number of light emitting diodes on the electronic circuit board, and the connecting means enabling the connection of the power connector means of the electronic circuit board to provide power to the heating board; (c) a reflector plate made of a heat conducting material having a top surface, a back surface, a multiplicity of inverted, hollow, conic frusta directed downwardly from the plane of the top surface, an attachment means, and an alignment means, the conic frusta number one each for each light emitting diode of the electronic circuitry board and are aligned such that each conic frustum is directly over each light emitting diode, the attachment means enabling the attachment of attaching the heating board so that the front of the heating board is facing the back of the reflector plate; (d) a top cover having an interior surface, an exterior surface, a face, a first collar, and a second collar, the face enabling light pass, the interior surface of the face having a multiplicity of Fresnel lenses, the Fresnel lenses number one each for each conic frustum of the reflector plate and situated on the top cover so that they align over the corresponding conic frustum, the first collar having an attaching means, and the second collar having an alignment means; and (e) a bottom cover having an exterior surface, an interior surface, a power connector, a set of finished plugs, a multiplicity of risers, a first alignment means, and a second alignment means, the exterior surface having a reciprocal attaching means to the first collar of the top cover, the set of finished plugs residing on the exterior surface, the power connector residing in the interior of the bottom cover connected to the interior portion of the finished plugs at one end and the electrical connector of the electronic circuit board, the first alignment means aligning with the alignment means of the electronic circuit board, the second alignment means aligning with the alignment means of the top cover, reflector plate and heating board.

Defined broadly, the present invention is light assembly device providing an efficient light source and a non-intrusive heating element to remove and reduce the effects of inclement weather comprising: (a) an electronic circuit board having a multiplicity of light emitting diodes, a corresponding circuitry, and a power connector means, the power connector means enabling the providing power to the electronic circuit board and a heating board; (b) a heating board having a microcontroller, electronic components, a sensor, heating elements, an electric power connecting means, and apertures, the sensor enabling the sensing temperatures, the microcontroller enabling the activating and deactivating the heating elements, the number of apertures at least equal to the number of light emitting diodes on the electronic circuit board, and the electric connecting means enabling the connection to the power connector means of the electronic circuit board to provide power to the heating board; (c) a reflector plate made of a heat conducting material having a top surface, a back surface, a multiplicity of inverted, hollow, conic frusta directed downwardly from the plane of the top surface, and an attachment means, the conic frusta number one each for each light emitting diode of the electronic circuitry board and are aligned such that each conic frustum is directly over each light emitting diode, the attachment means enabling the attaching the heating board to the back surface of the reflector plate; (d) a top cover having an interior surface, an exterior surface, a face, and an attachment means, the face enabling light to pass therethrough, the interior surface of the face having a multiplicity of Fresnel lenses, the Fresnel lenses number one each for each conic frustum of the reflector plate and situated on the top cover so that they align over the corresponding conic frustum; and (e) a bottom cover having an exterior surface, an interior surface, a power connector, and an attachment means, the attachment means being a reciprocal attaching means to the top cover, the power connector enabling the providing power from outside the light assembly to the electronic components within.

Defined more broadly, the present invention is a light assembly device providing an efficient light source and a non-intrusive heating element to remove and reduce the effects of inclement weather comprising: (a) an electronic circuit board having at least one light emitting diode, a corresponding circuitry, and a power connector means, the power connector means enabling the providing power to the electronic circuit board and a heating board; (b) a heating board having a microcontroller, electronic components, a sensor, heating elements, a electric power connecting means, and at least one aperture, the sensor enabling the sensing temperatures, the microcontroller enabling the activating and deactivating the heating elements, the at least one aperture positioned on the heating board to correspond with the location of the at least one light emitting diode, and the electric power connecting means enabling the of connecting to the power connector means of the electronic circuit board to provide power to the heating board; (c) a reflector plate made of a heat conducting material having a top surface, a back surface, at least one light reflector, and an attachment means, the at least one light reflector positioned over the at least one light emitting diode, the attachment means enabling the attachment of the heating board to the back surface of the reflector plate; (d) a top cover having an interior surface, an exterior surface, a face, and an attachment means, the face enabling light to pass therethrough; and (e) a bottom cover having an exterior surface, an interior surface, a power connector, and an attachment means, the attachment means being a reciprocal attaching means to the top cover, the power connector enabling the providing power from outside the light assembly to the electronic components within.

Defined even more broadly, the present invention is a light assembly for a vehicle, comprising: a heating board positioned within a light assembly of a vehicle which includes a lens cover and a lens to direct a beam of light from the light assembly, and which heating board is positioned within a lens housing and behind the lens and in front of the source of illumination within the housing, the heating board having means to permit the light from the source of illumination to shine through the heating board, the heating board comprising a sensor to turn the heating board on after air temperature outside the vehicle has declined to a certain level to enable the heating board to generate sufficient heat to defrost and otherwise remove snow and fog from the lens.

Defined even more broadly, the present invention is a lens assembly for a vehicle comprising a heating board within it which is powered by the electrical system of the vehicle, the heating board comprising a sensor which activates the heating board to generate heat within the lens assembly after a predetermined temperature external to the lens assembly has been achieved, so that the heating board will enable cold element effects on the lens to be reduced to enable a beam of light from the lens assembly to shine unobstructed through the lens.

Of course the present invention is not intended to be restricted to any particular form or arrangement, or any specific embodiment, or any specific use, disclosed herein, since the same may be modified in various particulars or relations without departing from the spirit or scope of the claimed invention herein above shown and described of which the apparatus or method shown is intended only for illustration and disclosure of an operative embodiment and not to show all of the various forms or modifications in which this invention might be embodied or operated.

What is claimed is:

1. A light assembly comprising:
   a. an electronic circuit board having at least one light emitting diode and a power connector means, wherein the power connector means electrically connect the electronic circuit board to a power source;
   b. a heating board having a control circuit including a microcontroller, a temperature sensor, heating elements, power connecting means, apertures, and at least one aperture, wherein the control circuit controls activation of the heating elements based on the temperature sensor, the at least one aperture positioned on the heating board to correspond with the location of the at least one light emitting diode, and the power connecting means being electrically connected to the power connector means of the electronic circuit board to provide power to the heating board;
   c. a heat conducting reflector plate having a top surface, a back surface, a at least one hollow frusto-conical reflector, and an attachment means, wherein the at least one hollow frusto-conical reflector is positioned and aligned directly over the at least one light emitting diode, the attachment means being for the attachment of the heating board to the back surface of the reflector plate;
   d. a top cover having an interior surface, an exterior surface, a face, and top cover attachment means, the face being at least translucent; and
   e. a bottom cover having an exterior surface, an interior surface, a power connector, and bottom cover attachment means being a reciprocal of the top cover attachment means, the power connector being for providing power from outside the light assembly to the electronic circuit board and heating board.

2. The light assembly device in accordance with claim 1, wherein said top cover has at least one Fresnel lens situated over and aligned with the at least one light emitting diode and the at least one light reflector.

3. A light assembly device comprising:
   a. an electronic circuit board having a plurality of light emitting diodes, and a power connector means, wherein the power connector means electrically connect the electronic circuit board to a power source;
   b. a heating board having a control circuit including a microcontroller and a temperature sensor, heating elements, an electric power connecting means, and apertures, wherein the control circuit controls activation of the heating elements based on the temperature sensor, the number of apertures being at least equal to the number of light emitting diodes, and the electric power connecting means being electrically connected to the power connector means of the electronic circuit board to provide power to the heating board;
   c. a heat conducting reflector plate having a top surface, a back surface, a plurality of hollow frusto-conical reflectors with each vertex directed downwardly from the plane of top surface, and attachment means, wherein each frusto-conical reflector is positioned and aligned directly over a corresponding light emitting diode, the attachment means being for attaching the heating board to the back surface of the reflector plate;
   d. a top cover having an interior surface including a plurality of Fresnel lenses, an exterior surface, a face being at least translucent, and top cover attachment means, wherein each Fresnel lens is positioned and aligned over a corresponding frusto-conical reflector; and
   e. a bottom cover having an exterior surface, an interior surface, a power connector located on the interior surface with access to the exterior surface, and bottom cover attachment means, wherein the bottom cover attachment means is configured to reciprocally engage the top cover attaching means, the power connector being connected to a power source and to the electronic circuit board and heating board.

4. The light assembly device in accordance with claim 1, wherein said top cover is made of a transparent, hard plastic material.

5. The light assembly device in accordance with claim 1, wherein said face of the top cover is made of a transparent, hard plastic or polymer material.

6. The light assembly device in accordance with claim 1, wherein said top cover is made of a transparent, tempered glass.

7. The light assembly device in accordance with claim 1, wherein said bottom cover is made of a hard, crack resistant material.

8. The light assembly device in accordance with claim 1, wherein said bottom cover is made of a hard, plastic or polymer.

9. The light assembly device in accordance with claim 1, wherein said bottom cover is made of a metal material.

10. A light assembly for a vehicle comprising:
    a. an electronic circuit board having at least one light emitting diode and a power connector means, wherein the power connector means electrically connect the electronic circuit board to a power source;
    b. a heating board including heating elements, and a sensor configure to activate the heating elements when the air temperature outside the vehicle has declined to a certain level
    c. a heat conducting reflector plate having a top surface, a back surface, at least one hollow frusto-conical reflector and an attachment means, wherein the at least one hollow frusto-conical reflector is positioned and aligned directly over the at least one light emitting diode, the attachment being for the attachment of the heating board to the back surface of the reflector plate and
    d. lens housing containing the electronic circuit board, the heating board and the heat conducting reflector, the lens housing further including a lens cover having a lens for directing a beam of light from the at least one light emitting diode, wherein the heating elements are configured to defrost and remove snow and fog from the lens cover.

11. The light assembly for a vehicle in accordance with claim 10 further comprising:
    a. the power connector means is a ponytail connection.

12. The light assembly in accordance with claim 11, wherein the sensor is further configured to deactivate the heating elements after the air temperature outside the vehicle has risen to a certain level.

13. The light assembly device of claim 3, further including assembly alignment means for properly aligning the electronic circuit board, the heating board, the heat conducting reflector and the top and bottom covers.

14. The light assembly device of claim 3, further including assembly alignment means for properly aligning the electronic circuit board, the heating board, the heat conducting reflector and the top and bottom covers.

15. The light assembly device in accordance with claim 13, wherein said top cover is made of a transparent, hard material from the group consisting of plastic, polymer and resin.

16. The light assembly device in accordance with claim 13, wherein said face of the top cover is made of a transparent, hard material from the group consisting of plastic, polymer and resin.

17. The light assembly device in accordance with claim 3, wherein said top cover is made of a transparent, tempered glass.

18. The light assembly device in accordance with claim 13, wherein said bottom cover is made of a hard, crack resistant material.

19. The light assembly device in accordance with claim 13, wherein said bottom cover is made of a hard material from the group consisting of plastic, polymer or resin.

20. The light assembly device in accordance with claim 13, wherein said bottom cover is made of a metal material.

21. A light assembly device for a motor vehicle, said device comprising:
   a. an electronic circuit board having a plurality of light emitting diodes, power connector means, and alignment means, wherein the power connector means electrically connect the electronic circuit board to a power source;
   b. a heating board having a front surface, a back surface, a control circuit including a microcontroller and a temperature sensor, heating elements, connecting means, apertures, eyelets, and alignment means, wherein the control circuit controls activation of the heating elements based on the temperature sensor, the number of apertures being at least equal to the number of light emitting diodes, and the connecting means being electrically connected to the power connector means of the electronic circuit board to provide power to the heating board;
   c. a heat conducting reflector plate having a top surface, a back surface, a plurality of hollow frusto-conical reflectors with each vertex directed downwardly from the plane of top surface, attachment means, and alignment means, wherein each frusto-conical reflector is positioned and aligned directly over a corresponding light emitting diode, the attachment means being for attaching the heating board to the reflector plate such that the front of the heating board is facing the back of the reflector plate;
   d. a top cover having an interior surface including a plurality of Fresnel lenses, an exterior surface, a face being at least translucent, a first collar, and a second collar, wherein each Fresnel lens is positioned and aligned over a corresponding frusto-conical reflector, the first and second collars having respective attaching means; and
   e. a bottom cover having an exterior surface, an interior surface, a power connector located on the interior surface, a set of finished plugs located on the exterior surface, a plurality of risers, and a first and second alignment means, wherein the exterior surface attaching means configured to receive the first collar of the top cover, the power connector being connected to the finished plugs at one end and the electrical connector of the electronic circuit board at another end, the first alignment means engaging the alignment means of the electronic circuit board, and the second alignment means engaging the alignment means of the top cover, the reflector plate and the heating board.

22. The light assembly device in accordance with claim 21, wherein said top cover is made of a transparent, hard material from the group consisting of plastic, polymer and resin.

23. The light assembly device in accordance with claim 21, wherein said face of the top cover is made of a transparent, hard material, from the group consisting of plastic, polymer and resin.

24. The light assembly device in accordance with claim 21, wherein said top cover is made of a transparent, tempered glass.

25. The light assembly device in accordance with claim 21, wherein said bottom cover is made of a hard, crack resistant material.

26. The light assembly device in accordance with claim 21, wherein said bottom cover is made of a hard material, from the group consisting of plastic, polymer or resin.

* * * * *